US008861487B2

(12) United States Patent
Chin et al.

(10) Patent No.: US 8,861,487 B2
(45) Date of Patent: Oct. 14, 2014

(54) FACILITATING OPEN LOOP POWER CONTROL IN TD-SCDMA MULTI-CARRIER SYSTEMS

(75) Inventors: Tom Chin, San Diego, CA (US); Guangming Shi, San Diego, CA (US); Kuo-Chun Lee, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 801 days.

(21) Appl. No.: 12/909,699

(22) Filed: Oct. 21, 2010

(65) Prior Publication Data

US 2011/0261707 A1 Oct. 27, 2011

Related U.S. Application Data

(60) Provisional application No. 61/319,551, filed on Mar. 31, 2010.

(51) Int. Cl.
| | | |
|---|---|---|
| *H04J 3/00* | (2006.01) | |
| *H04W 52/10* | (2009.01) | |
| *H04W 52/42* | (2009.01) | |
| *H04W 52/16* | (2009.01) | |
| *H04W 52/14* | (2009.01) | |

(52) U.S. Cl.
CPC .............. *H04W 52/10* (2013.01); *H04W 52/42* (2013.01); *H04W 52/16* (2013.01); *H04W 52/146* (2013.01)
USPC ....................................................... 370/337

(58) Field of Classification Search
USPC ....................................................... 370/337
See application file for complete search history.

(56) References Cited

U.S. PATENT DOCUMENTS

2002/0196758 A1* 12/2002 Shoji et al. ................... 370/337
2005/0282574 A1* 12/2005 Li et al. ......................... 455/522
(Continued)

FOREIGN PATENT DOCUMENTS

| CN | 1383692 A | 12/2002 |
|---|---|---|
| WO | WO9914869 A2 | 3/1999 |
| WO | WO2007120020 A1 | 10/2007 |

OTHER PUBLICATIONS

Alcatel-Lucent Shanghai Bell et al: Pusch Power Control for Carrier Aggregation, 3GPP Draft; R1-093770, 3rd Generation Partnership Project (3GPP), Mobile Competence Centre ; 650, Route Des Lucioles ; F-06921 Sophia-Antipolis Cedex ; France, No. Miyazaki; 20091012, Oct. 12, 2009, XP050388290, [retrieved on Oct. 6, 2009].

(Continued)

*Primary Examiner* — Mark Rinehart
*Assistant Examiner* — Matthew Hopkins
(74) *Attorney, Agent, or Firm* — Kristine U. Ekwueme

(57) ABSTRACT

Open loop power control in Time Division-Synchronous Code Division Multiple Access (TD-SCDMA) multi-carrier systems is facilitated through the determination of a value for open loop control on a primary carrier frequency which is then used to perform open loop control on at least one secondary carrier frequency in the multi-carrier system. This determined open loop control value may be applied using the value determined on the primary carrier frequency, or may be further adjusted using an estimated difference between received power of the primary carrier frequency and the secondary carrier frequencies, in selected aspects. When the pilot signals in the secondary carrier frequencies are transmitted at different power levels, this open loop control value may be further adjusted with a transmit power level offset.

24 Claims, 7 Drawing Sheets

(56) References Cited

U.S. PATENT DOCUMENTS

2008/0285522 A1* 11/2008 Ma et al. .................. 370/335
2009/0116432 A1* 5/2009 Ma et al. .................. 370/329
2009/0252123 A1* 10/2009 Iacono et al. ............. 370/335

OTHER PUBLICATIONS

Catt: "Considerations on uplink power control in LTE-Advanced", 3GPP Draft; R1-100071, 3rd Generation Partnership Project (3GPP), Mobile Competence Centre ; 650, Route Des Lucioles ; F-06921 Sophia-Antipolis Cedex ; France, vol. RAN WGI, No. Valencia, Spain; 20100118, Jan. 12, 2010, XP050417814, [retrieved on Jan. 12, 2010].

International Search Report and Written Opinion—PCT/US2011/030826, ISA/EPO—Jul. 21, 2011.

Nokia Siemens Networks et al: "Pusch Power Control for LTE-Advanced", 3GPP Draft; R1-091372_UL_PC_LTEA, 3rd Generation Partnership Project (3GPP), Mobile Competence Centre; 650, Route Des Lucioles; F-06921 Sophia-Antipolis Cedex; France, No. Seoul, Korea; 20090318, Mar. 18, 2009, XP050338962, [retrieved on Mar. 18, 2009].

* cited by examiner

FACILITATING OPEN LOOP POWER CONTROL IN TD-SCDMA MULTI-CARRIER SYSTEMS

CROSS REFERENCE TO RELATED APPLICATION

This application claims the benefit of U.S. provisional patent application No. 61/319,551 filed Mar. 31, 2010, in the names of CHIN et al., the disclosure of which is expressly incorporated herein by reference in its entirety.

BACKGROUND

1. Field

Aspects of the present disclosure relate, in general, to wireless communication systems, and more particularly, to facilitating open loop power control in Time Division-Synchronous Code Division Multiple Access (TD-SCDMA) multi-carrier systems.

2. Background

Wireless communication networks are widely deployed to provide various communication services such as telephony, video, data, messaging, broadcasts, and so on. Such networks, which are usually multiple access networks, support communications for multiple users by sharing the available network resources. One example of such a network is the Universal Terrestrial Radio Access Network (UTRAN). The UTRAN is the radio access network (RAN) defined as a part of the Universal Mobile Telecommunications System (UTMS), a third generation (3G) mobile phone technology supported by the 3rd Generation Partnership Project (3GPP). The UMTS, which is the successor to Global System for Mobile Communications (GSM) technologies, currently supports various air interface standards, such as Wideband-Code Division Multiple Access (W-CDMA), Time Division-Code Division Multiple Access (TD-CDMA), and Time Division-Synchronous Code Division Multiple Access (TD-SCDMA). For example, China is pursuing TD-SCDMA as the underlying air interface in the UTRAN architecture with its existing GSM infrastructure as the core network. The UMTS also supports enhanced 3G data communications protocols, such as High Speed Downlink Packet Data (HSDPA), which provides higher data transfer speeds and capacity to associated UMTS networks.

As the demand for mobile broadband access continues to increase, research and development continue to advance the UMTS technologies not only to meet the growing demand for mobile broadband access, but to advance and enhance the user experience with mobile communications.

SUMMARY

In one aspect of the disclosure, a method for open loop power control in a multi-carrier TD-SCDMA communication system includes determining a value for open loop power control on a primary carrier frequency in the multi-carrier TD-SCDMA communication system and performing open loop power control on at least one secondary carrier frequency in the multi-carrier TD-SCDMA system based on the determined value.

In another aspect of the disclosure, a user equipment is used for performing open loop power control in a multi-carrier TD-SCDMA communication system. This user equipment includes means for determining a value for open loop power control on a primary carrier frequency in the multi-carrier TD-SCDMA communication system and means for performing open loop power control on at least one secondary carrier frequency in the multi-carrier TD-SCDMA system based on the determined value.

In another aspect of the disclosure, a computer program product includes a computer-readable medium having program code stored thereon, in which this program code includes code for determining a value for open loop power control on a primary carrier frequency in the multi-carrier TD-SCDMA communication system and code for performing open loop power control on at least one secondary carrier frequency in the multi-carrier TD-SCDMA system based on the determined value.

In an aspect of the disclosure, a user equipment is used for wireless communication, in which the user equipment includes at least one processor and a memory coupled to the processor or processors. The processors are configured to determine a value for open loop power control on a primary carrier frequency in the multi-carrier TD-SCDMA communication system and perform open loop power control on at least one secondary carrier frequency in the multi-carrier TD-SCDMA system based on the determined value.

DETAILED DESCRIPTION

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

Figure 1:
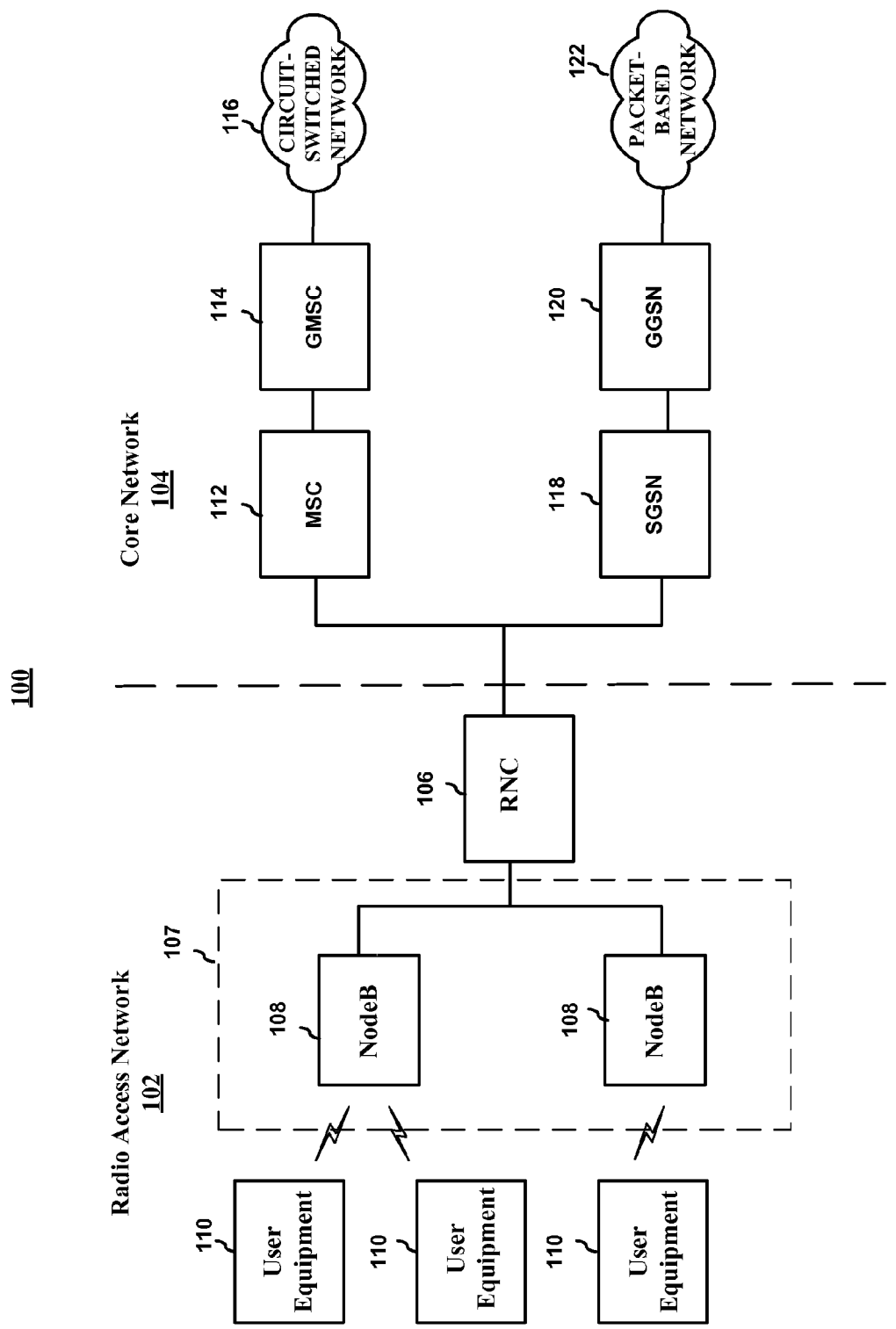
FIG. 1 is a block diagram conceptually illustrating an example of a telecommunications system.

Turning now to FIG. 1, a block diagram is shown illustrating an example of a telecommunications system 100. The various concepts presented throughout this disclosure may be implemented across a broad variety of telecommunication systems, network architectures, and communication standards. By way of example and without limitation, the aspects of the present disclosure illustrated in FIG. 1 are presented with reference to a UMTS system employing a TD-SCDMA standard. In this example, the UMTS system includes a (radio access network) RAN 102 (e.g., UTRAN) that provides various wireless services including telephony, video, data, messaging, broadcasts, and/or other services. The RAN 102 may be divided into a number of Radio Network Subsystems (RNSs), such as an RNS 107, each controlled by a Radio Network Controller (RNC), such as an RNC 106. For clarity, only the RNC 106 and the RNS 107 are shown; however, the RAN 102 may include any number of RNCs and RNSs in addition to the RNC 106 and RNS 107. The RNC 106 is an apparatus responsible for, among other things, assigning, reconfiguring and releasing radio resources within the RNS 107. The RNC 106 may be interconnected to other RNCs (not shown) in the RAN 102 through various types of interfaces, such as a direct physical connection, a virtual network, or the like, using any suitable transport network.

The geographic region covered by the RNS 107 may be divided into a number of cells, with a radio transceiver apparatus serving each cell. A radio transceiver apparatus is commonly referred to as a Node B in UMTS applications, but may also be referred to by those skilled in the art as a base station (BS), a base transceiver station (BTS), a radio base station, a radio transceiver, a transceiver function, a basic service set (BSS), an extended service set (ESS), an access point (AP), or some other suitable terminology. For clarity, two Node Bs 108 are shown; however, the RNS 107 may include any number of wireless Node Bs. The Node Bs 108 provide wireless access points to a core network 104 for any number of mobile apparatuses. Examples of a mobile apparatus include a cellular phone, a smart phone, a session initiation protocol (SIP) phone, a laptop, a notebook, a netbook, a smartbook, a personal digital assistant (PDA), a satellite radio, a global positioning system (GPS) device, a multimedia device, a video device, a digital audio player (e.g., MP3 player), a camera, a game console, or any other similar functioning device. The mobile apparatus is commonly referred to as user equipment (UE) in UMTS applications, but may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. For illustrative purposes, three UEs 110 are shown in communication with the Node Bs 108. The downlink (DL) also called the forward link, refers to the communication link from a Node B to a UE, and the uplink (UL), also called the reverse link, refers to the communication link from a UE to a Node B.

The core network 104, as shown, includes a GSM core network. However, as those skilled in the art will recognize, the various concepts presented throughout this disclosure may be implemented in a RAN, or other suitable access network, to provide UEs with access to types of core networks other than GSM networks.

In this example, the core network 104 supports circuit-switched services with a mobile switching center (MSC) 112 and a gateway MSC (GMSC) 114. One or more RNCs, such as the RNC 106, may be connected to the MSC 112. The MSC 112 is an apparatus that controls call setup, call routing, and UE mobility functions. The MSC 112 also includes a visitor location register (VLR) (not shown) that contains subscriber-related information for the duration that a UE is in the coverage area of the MSC 112. The GMSC 114 provides a gateway through the MSC 112 for the UE to access a circuit-switched network 116. The GMSC 114 includes a home location register (HLR) (not shown) containing subscriber data, such as the data reflecting the details of the services to which a particular user has subscribed. The HLR is also associated with an authentication center (AuC) that contains subscriber-specific authentication data. When a call is received for a particular UE, the GMSC 114 queries the HLR to determine the UE's location and forwards the call to the particular MSC serving that location.

The core network 104 also supports packet-data services with a serving GPRS support node (SGSN) 118 and a gateway GPRS support node (GGSN) 120. GPRS, which stands for General Packet Radio Service, is designed to provide packet-data services at speeds higher than those available with standard GSM circuit-switched data services. The GGSN 120 provides a connection for the RAN 102 to a packet-based network 122. The packet-based network 122 may be the Internet, a private data network, or some other suitable packet-based network. The primary function of the GGSN 120 is to provide the UEs 110 with packet-based network connectivity. Data packets are transferred between the GGSN 120 and the UEs 110 through the SGSN 118, which performs primarily the same functions in the packet-based domain as the MSC 112 performs in the circuit-switched domain.

The UMTS air interface is a spread spectrum Direct-Sequence Code Division Multiple Access (DS-CDMA) system. The spread spectrum DS-CDMA spreads user data over a much wider bandwidth through multiplication by a sequence of pseudorandom bits called chips. The TD-SCDMA standard is based on such direct sequence spread spectrum technology and additionally calls for a time division duplexing (TDD), rather than a frequency division duplexing (FDD) as used in many FDD mode UMTS/W-CDMA systems. TDD uses the same carrier frequency for both the uplink (UL) and downlink (DL) between a Node B 108 and a UE 110, but divides uplink and downlink transmissions into different time slots in the carrier.

Figure 2:
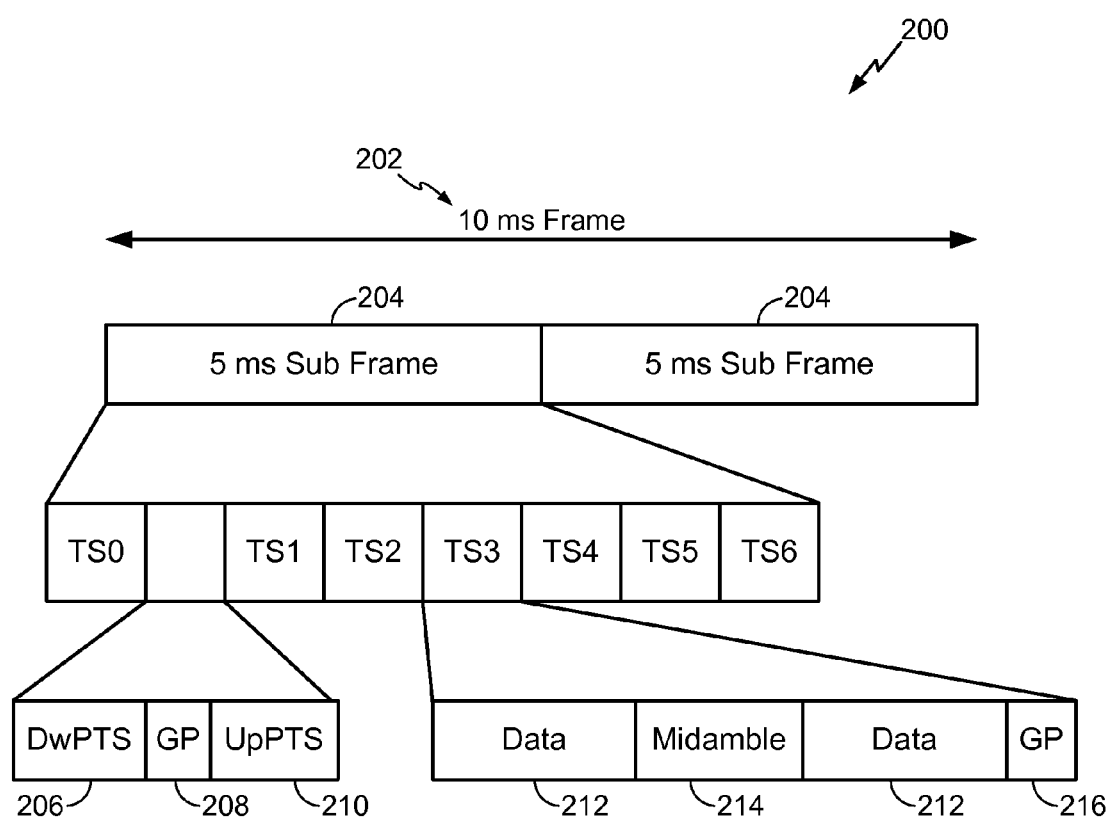
FIG. 2 is a block diagram conceptually illustrating an example of a frame structure in a telecommunications system.

FIG. 2 shows a frame structure 200 for a TD-SCDMA carrier. The TD-SCDMA carrier, as illustrated, has a frame 202 that is 10 ms in length. The frame 202 has two 5 ms subframes 204, and each of the subframes 204 includes seven time slots, TS0 through TS6. The first time slot, TS0, is usually allocated for downlink communication, while the second time slot, TS1, is usually allocated for uplink communication. The remaining time slots, TS2 through TS6, may be used for either uplink or downlink, which allows for greater flexibility during times of higher data transmission times in either the uplink or downlink directions. A downlink pilot time slot (DwPTS) 206 (also known as the downlink pilot channel (DwPCH)), a guard period (GP) 208, and an uplink pilot time slot (UpPTS) 210 (also known as the uplink pilot channel (UpPCH)) are located between TS0 and TS1. Each time slot, TS0-TS6, may allow data transmission multiplexed on a maximum of 16 code channels. Data transmission on a code channel includes two data portions 212 separated by a midamble 214 and followed by a guard period (GP) 216. The midamble 214 may be used for features, such as channel estimation, while the GP 216 may be used to avoid inter-burst interference.

Figure 3:
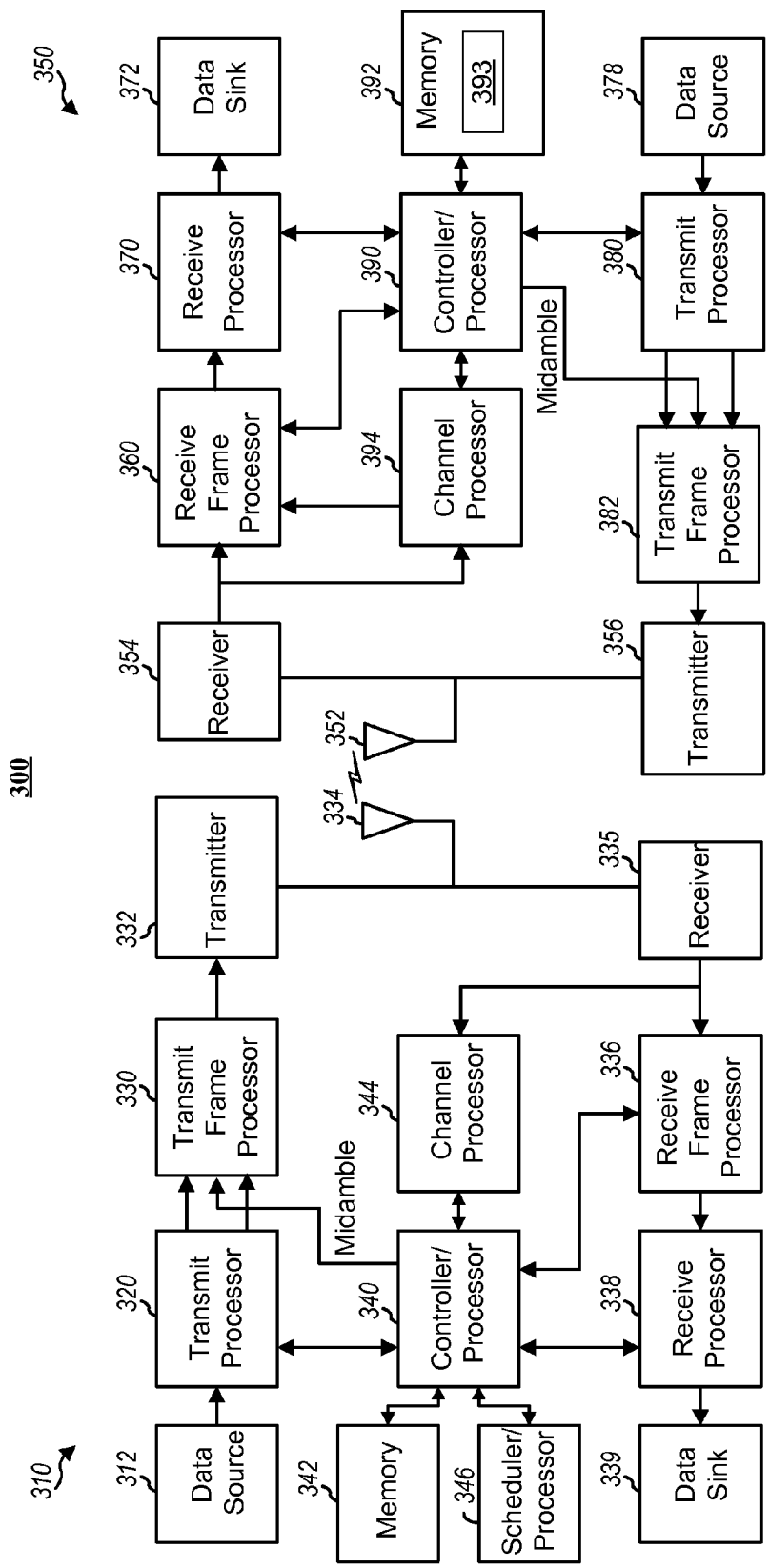
FIG. 3 is a block diagram conceptually illustrating an example of a Node B in communication with a UE in a telecommunications system.

FIG. 3 is a block diagram of a Node B 310 in communication with a UE 350 in a RAN 300, where the RAN 300 may be the RAN 102 in FIG. 1, the Node B 310 may be the Node B 108 in FIG. 1, and the UE 350 may be the UE 110 in FIG. 1. In the downlink communication, a transmit processor 320 may receive data from a data source 312 and control signals from a controller/processor 340. The transmit processor 320 provides various signal processing functions for the data and control signals, as well as reference signals (e.g., pilot signals). For example, the transmit processor 320 may provide cyclic redundancy check (CRC) codes for error detection, coding and interleaving to facilitate forward error correction (FEC), mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM), and the like), spreading with orthogonal variable spreading factors (OVSF), and multiplying with scrambling codes to produce a series of symbols. Channel estimates from a channel processor 344 may be used by a controller/processor 340 to determine the coding, modulation, spreading, and/or scrambling schemes for the transmit processor 320. These channel estimates may be derived from a reference signal transmitted by the UE 350 or from feedback contained in the midamble 214 (FIG. 2) from the UE 350. The symbols generated by the transmit processor 320 are provided to a transmit frame processor 330 to create a frame structure. The transmit frame processor 330 creates this frame structure by multiplexing the symbols with a midamble 214 (FIG. 2) from the controller/processor 340, resulting in a series of frames. The frames are then provided to a transmitter 332, which provides various signal conditioning functions including amplifying, filtering, and modulating the frames onto a carrier for downlink transmission over the wireless medium through smart antennas 334. The smart antennas 334 may be implemented with beam steering bidirectional adaptive antenna arrays or other similar beam technologies.

At the UE 350, a receiver 354 receives the downlink transmission through an antenna 352 and processes the transmission to recover the information modulated onto the carrier. The information recovered by the receiver 354 is provided to a receive frame processor 360, which parses each frame, and provides the midamble 214 (FIG. 2) to a channel processor 394 and the data, control, and reference signals to a receive processor 370. The receive processor 370 then performs the inverse of the processing performed by the transmit processor 320 in the Node B 310. More specifically, the receive processor 370 descrambles and despreads the symbols, and then determines the most likely signal constellation points transmitted by the Node B 310 based on the modulation scheme. These soft decisions may be based on channel estimates computed by the channel processor 394. The soft decisions are then decoded and deinterleaved to recover the data, control, and reference signals. The CRC codes are then checked to determine whether the frames were successfully decoded. The data carried by the successfully decoded frames will then be provided to a data sink 372, which represents applications running in the UE 350 and/or various user interfaces (e.g., display). Control signals carried by successfully decoded frames will be provided to a controller/processor 390. When frames are unsuccessfully decoded by the receiver processor 370, the controller/processor 390 may also use an acknowledgement (ACK) and/or negative acknowledgement (NACK) protocol to support retransmission requests for those frames.

In the uplink, data from a data source 378 and control signals from the controller/processor 390 are provided to a transmit processor 380. The data source 378 may represent applications running in the UE 350 and various user interfaces (e.g., keyboard, pointing device, track wheel, and the like). Similar to the functionality described in connection with the downlink transmission by the Node B 310, the transmit processor 380 provides various signal processing functions including CRC codes, coding and interleaving to facilitate FEC, mapping to signal constellations, spreading with OVSFs, and scrambling to produce a series of symbols. Channel estimates, derived by the channel processor 394 from a reference signal transmitted by the Node B 310 or from feedback contained in the midamble transmitted by the Node B 310, may be used to select the appropriate coding, modulation, spreading, and/or scrambling schemes. The symbols produced by the transmit processor 380 will be provided to a transmit frame processor 382 to create a frame structure. The transmit frame processor 382 creates this frame structure by multiplexing the symbols with a midamble 214 (FIG. 2) from the controller/processor 390, resulting in a series of frames. The frames are then provided to a transmitter 356, which provides various signal conditioning functions including amplification, filtering, and modulating the frames onto a carrier for uplink transmission over the wireless medium through the antenna 352.

The uplink transmission is processed at the Node B 310 in a manner similar to that described in connection with the receiver function at the UE 350. A receiver 335 receives the uplink transmission through the smart antennas 334 and processes the transmission to recover the information modulated onto the carrier. The information recovered by the receiver 335 is provided to a receive frame processor 336, which parses each frame, and provides the midamble 214 (FIG. 2) to the channel processor 344 and the data, control, and reference signals to a receive processor 338. The receive processor 338 performs the inverse of the processing performed by the transmit processor 380 in the UE 350. The data and control signals carried by the successfully decoded frames may then be provided to a data sink 339 and the controller/processor 340, respectively. If some of the frames were unsuccessfully decoded by the receive processor 338, the controller/processor 340 may also use an acknowledgement (ACK) and/or negative acknowledgement (NACK) protocol to support retransmission requests for those frames.

The controller/processors 340 and 390 may be used to direct the operation at the Node B 310 and the UE 350, respectively. For example, the controller/processors 340 and 390 may provide various functions including timing, peripheral interfaces, voltage regulation, power management, and other control functions. The computer readable media of memories 342 and 392 may store data and software for the Node B 310 and the UE 350, respectively. For example, the memory 392 of the UE 350 includes an open loop power control module 393, which, when executed by the controller/processor 390, the open loop power control module 393 configures the UE 350 to perform open loop power control. A scheduler/processor 346 at the Node B 310 may be used to allocate resources to the UEs and schedule downlink and/or uplink transmissions for the UEs.

Figure 4:
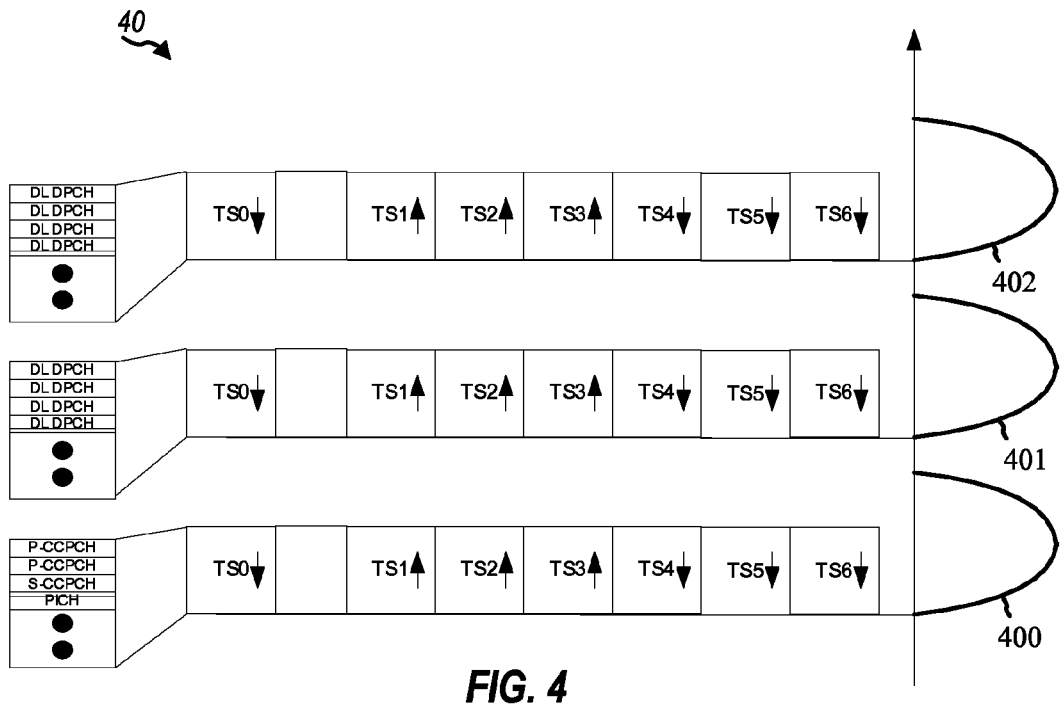
FIG. 4 is a block diagram illustrating carrier frequencies in a multi-carrier TD-SCDMA communication system.

In order to provide more capacity, the TD-SCDMA system may allow multiple carrier signals or frequencies. Assuming that N is the total number of carriers, the carrier frequencies may be represented by the set $\{F(i), i=0, 1, \ldots, N-1\}$, where the carrier frequency, $F(0)$, is the primary carrier frequency and the rest are secondary carrier frequencies. For example, a cell can have three carrier signals whereby the data can be transmitted on some code channels of a time slot on one of the three carrier signal frequencies. FIG. 4 is a block diagram illustrating carrier frequencies 40 in a multi-carrier TD-SCDMA communication system. The multiple carrier frequencies include a primary carrier frequency 400 ($F(0)$), and two secondary carrier frequencies 401 and 402 ($F(1)$ and $F(2)$). In such multi-carrier systems, the system overhead may be transmitted on the first time slot (TS0) of the primary carrier frequency 400, including the Primary Common Control Physical Channel (P-CCPCH), the Secondary Common Control Physical Channel (S-CCPCH), the Pilot Indicator Channel (PICH), and the like. The traffic channels may then be carried on the remaining time slots (TS1-TS6) of the primary carrier frequency 400 and on the secondary carrier frequencies 401 and 402. Therefore, in such configurations, a UE will receive system information and monitor the paging messages on the primary carrier frequency 400 while transmitting and receiving data on either one or all of the primary carrier frequency 400 and the secondary carrier frequencies 401 and 402.

It should be noted that the DwPTS and UpPTS may be configured on the primary carrier frequency 400 and the secondary carrier frequencies 401 and 402. However, a random access procedure may be performed with the primary carrier frequency 400, while the handover uplink synchronization procedure may be performed with either or both of the primary carrier frequency 400 and the secondary carrier frequencies 401 and 402.

One function designated for the UE, when setting up an initial dedicated physical channel or handing over between Node Bs within the wireless communication system, is performing uplink open loop power control. In the initial dedicated physical channel setup, the UE may obtain the Primary CCPCH Transmission Power (P-CCPCH Tx Power) from system information messages, such as the System Information Block 6, as well as obtaining the desired signal-to-interference ratio (SIR) target of the Dedicated Physical Channel (DPCH) from the Radio Bearer Setup message. Therefore, the UE may obtain the Received P-CCPCH Power and P-CCPCH Tx Power through this accessible information in order to estimate the downlink transmission power loss, denoted by L. The downlink transmission power loss, L, is represented by the formula:

$$L = \text{P-CCPCH Tx Power} - \text{Received P-CCPCH Power} \quad (1)$$

Using L, the UE may then determine the initial uplink transmit power for DPCH (UL DPCH Tx Power). The UL DPCH Tx Power is determined by the formula:

$$\text{UL DPCH Tx Power} = PRX_{DPCHdes} + L \quad (2)$$

Where $PRX_{DPCHdes}$ represents the desired DPCH receive power at the cell's receiver, as signaled in the Radio Bearer Setup message. $PRX_{DPCHdes}$ is represented in dBm, while L is represented in dB. During handover, the above parameters at the target cell, P-CCPCH Tx Power and $PRX_{DPCHdes}$, may be signaled to the UE by the source cell in the Physical Channel Reconfiguration message.

In making the calculations for the open loop power control, the downlink transmission power loss, L, is used to estimate the uplink transmission power loss in equation (2). However, equation (2) does not address the multi-carrier use case because the transmission loss may be frequency dependent. Thus, in a multi-carrier embodiment, the open loop power control obtained using equations (1) and (2) may leave out additional transmission loss attributable to the additional secondary carrier frequencies. The various aspects of the present teachings provide solutions to the existing methods that may account for such multi-carrier system implementations.

Figure 5:
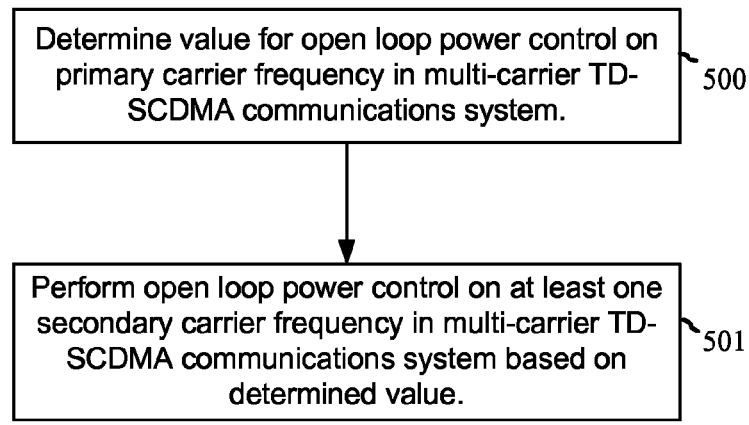
FIG. 5 is a functional block diagram illustrating example blocks executed to implement one aspect of the present teachings.

FIG. 5 is a functional block diagram illustrating example blocks executed to implement one aspect of the present teachings. In block 500, a value is determined for open loop power control on a primary carrier frequency in a multi-carrier TD-SCDMA communications system. For example, the open loop power control value may be determined by measuring the signal power of the P-CCPCH on the primary frequency and then using equation (1) to determine the transmission power loss, L. Based on this determined value, open loop power control is then performed, in block 501, on the secondary carrier frequencies of the cell in the multi-carrier TD-SCDMA communications system. This frequency independent aspect of the present teaching allows a single value representative of the primary carrier frequency downlink transmission loss to be used in the open loop power control for each of the secondary carrier frequencies in the multi-carrier system.

It should be noted that in alternative aspects of the present teachings the determined value may be obtained from an external source, such as a Node B.

Figure 6:
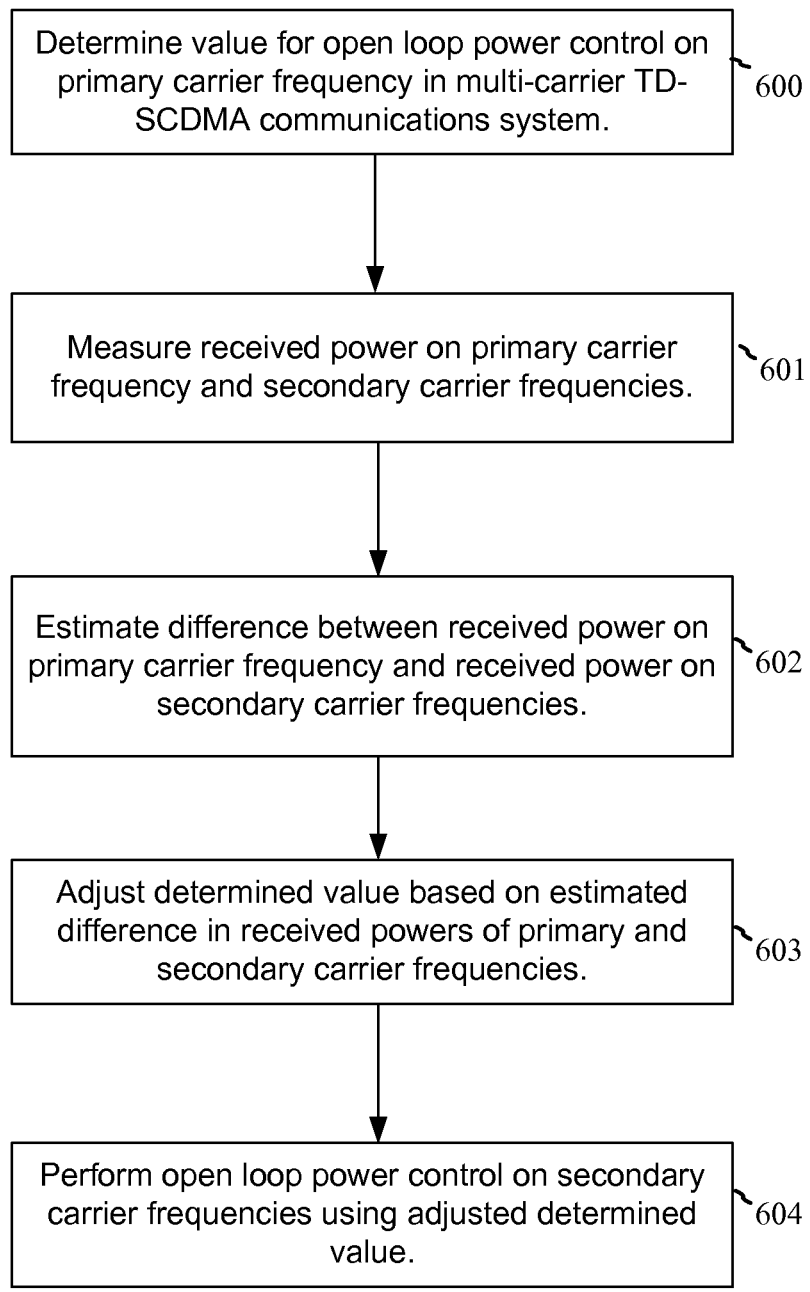
FIG. 6 is a functional block diagram illustrating example blocks executed to implement one aspect of the present teachings.

In an alternative aspect of the present teachings the transmission loss for the secondary carrier frequencies may be directly estimated and applied during open loop power control. FIG. 6 is a functional block diagram illustrating example blocks executed to implement one aspect of the present teachings. In block 600, a value is determined for open loop power control on a primary carrier frequency in a multi-carrier TD-SCDMA communications system. In operation, the UE may receive data over both the primary carrier frequency and the secondary carrier frequencies. Therefore, the UE also receives transmissions on the downlink pilot channel (DwPCH) of the secondary carrier frequencies. In block 601, the received power on the primary carrier frequency and the secondary carrier frequencies are measured. For example, the UE will measure the received power on the DwPTS of both the primary and secondary carrier frequencies. The difference between the received power of the primary carrier frequency and the received power on the secondary carrier frequencies is estimated, in block 602. The determined value based on the primary carrier frequency is then adjusted, in block 603, based on the estimated difference in received powers of the primary and secondary carrier frequencies. This adjustment expands on the calculations made for L in equation (1). When the estimated difference between the received powers of the primary and secondary carrier frequencies is now accounted for, the new formula becomes:

$$L(k) = L(0) + [\text{DwPCH received power at } F(0) - \text{DwPCH received power at } F(k)] \quad (3)$$

Where k is the index of carriers available in the TD-SCDMA communications network, L(0) is the downlink power transmission loss attributable to the primary carrier frequency, F(0). Using this adjusted value, L(k), the UE performs open loop power control, in block 604, on the secondary carrier frequencies. Thus, based on the received power difference of DwPTS on the primary and secondary carrier frequencies, some adjustment is applied to the loss based on the P-CCPCH channel measurement on the primary carrier frequency, L(0).

Figure 7:
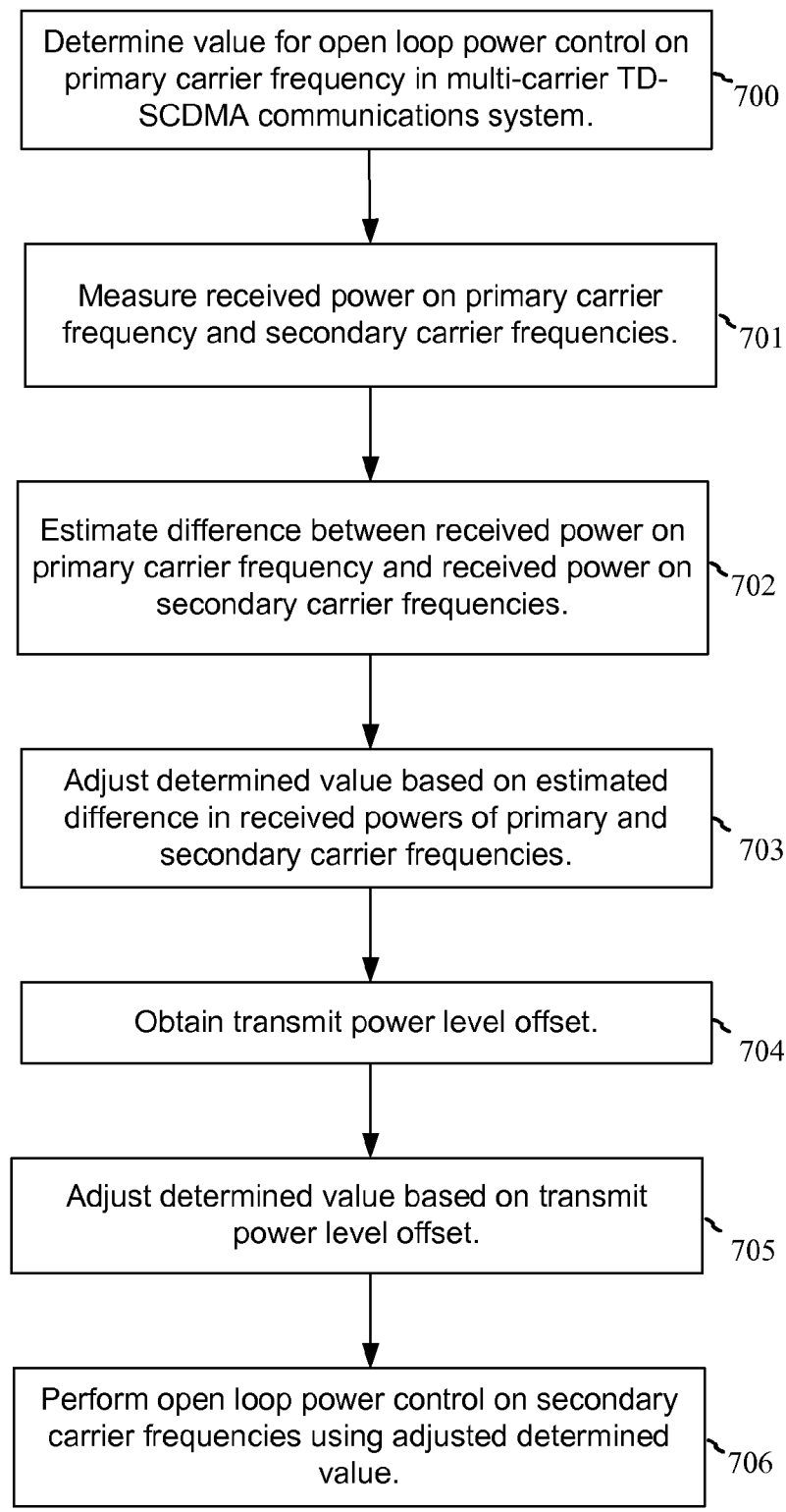
FIG. 7 is a functional block diagram illustrating example blocks executed to implement one aspect of the present teachings.

In still other aspects of the present teachings, the pilot signals of the secondary carrier frequencies may not be transmitted at the same power level. FIG. 7 is a functional block diagram illustrating example blocks executed to implement one aspect of the present teachings. In block 700, a value is determined for open loop power control on a primary carrier frequency in a multi-carrier TD-SCDMA communications system. The received power is measured, in block 701, on the primary carrier frequency and the secondary carrier frequencies. The difference between the received power on the primary carrier frequency and the received power on the secondary carrier frequencies is estimated in block 702. In block 703, the determined value is adjusted based on the estimated difference in received powers of the primary and secondary carrier frequencies. Because the multi-carrier TD-SCDMA communications system depicted in FIG. 7 provides for the pilot to be transmitted on the secondary carrier frequencies at a different power level than the primary carrier frequency pilot, another adjustment should be made in order to more accurately apply the transmission loss to the open loop power control. Therefore, a transmit power level offset is obtained in block 704.

The transmit power level offset may be obtained either through measurement and analysis of the carrier frequencies, or may be received from the Node B in one of the system information messages. For example, a system information message may include the power level offset of DwPCH for each secondary carrier frequency of the current cell. The Node B may also send the Physical Channel Reconfiguration message which may include the power level offset of the DwPCH for each secondary carrier frequency of the target cell. In block 705, the determined value is adjusted based on this transmit power level offset. Open loop power control is then performed, in block 706, on the secondary carrier frequencies using the adjusted value.

One formula for determining the transmission (Tx) power level offset is:

$$D(k)=\text{DwPCH Tx power at } F(k)-\text{DwPCH Tx power at } F(0) \quad (4)$$

Where k is the index of carriers available in the TD-SCDMA communications network, and D(k) is the transmission power offset between a secondary frequency F(k) and the primary frequency F(0). The UE can further adjust based on information in the calculation of the downlink loss using the formula where L(k) is the transmission loss on the secondary carrier k and L(0) is the transmission loss on the primary carrier:

$$L(k)=L(0)+[\text{DwPCH received power at } F(0)-\text{DwPCH received power at } F(k)]+D(k) \quad (5)$$

In various additional aspects of the present teachings, the power level offset may be measured as a relative value providing the relative offset between the secondary carrier frequencies and the primary carrier frequency. Still other aspects provide for an absolute value of the power level of the secondary frequencies after which the offset from the primary carrier frequency may be calculated.

Figure 8:
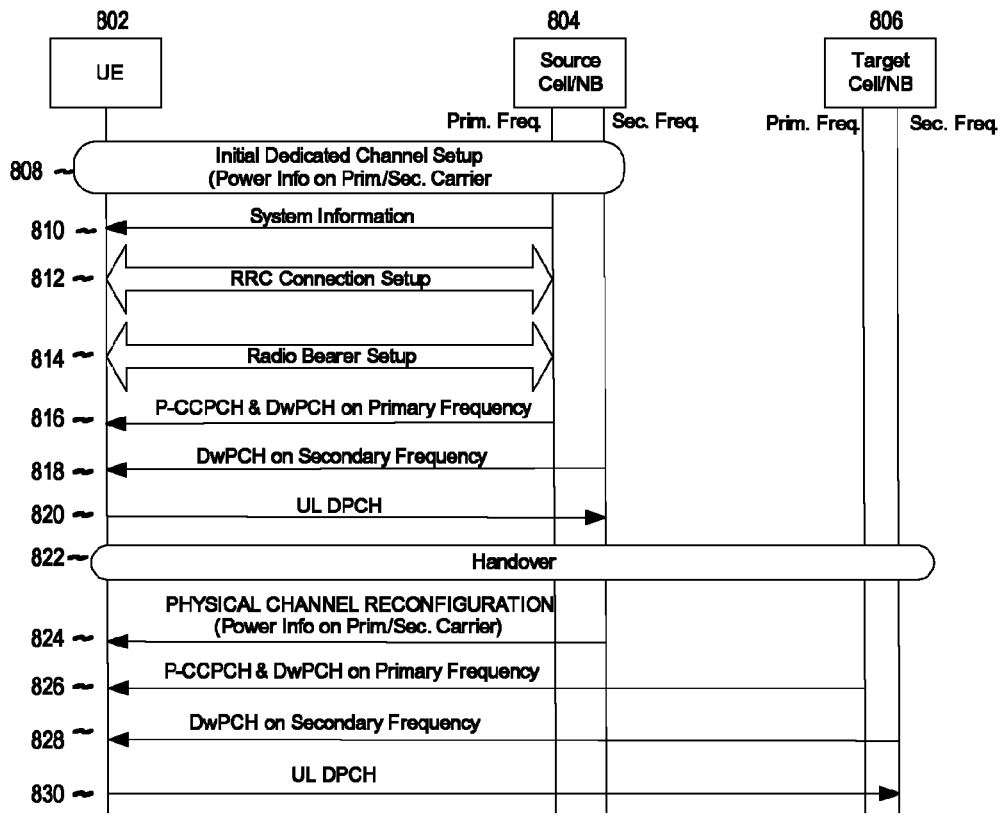
FIG. 8 is a flow diagram illustrating a handover call flow incorporating aspects of the present teachings.

FIG. 8 is a flow diagram illustrating a handover call flow incorporating aspects of the present teachings. At time 808 a UE 802 engages in initial dedicated channel setup with a source NB 804, exchanging power information regarding the primary and secondary carrier frequencies of the source NB 804. At time 810 the UE 802 receives system information from the source NB 804, including transmission power information on the primary carrier frequencies. At time 812 the UE 802 and source NB 804 engage in RRC connection setup over the primary carrier frequency. At time 814 the UE 802 and source NB 804 engage in radio bearer setup over the primary carrier frequency to set up the Dedicated Physical Channel (DPCH) on the secondary carrier frequency. At times 816 and 818 the UE 802 measures the received power on the primary/secondary carriers of the source NB 804 and estimates the downlink loss on the secondary frequency. At time 820 the UE 802 transmits to the source NB 804 using the uplink DPCH. The UE 802 then engages in handover between the source NB 804 and a target NB 806 at time 822. At time 824 channel reconfiguration with the secondary frequency of the source NB 804 occurs in which power information is exchanged with the UE 802. At times 826 and 828 the UE 802 measures the received power on the primary/secondary carriers of the target NB 806 and estimates the downlink loss on the secondary frequency. At time 830 the UE 802 transmits to the target NB 804 using the uplink DPCH.

In one configuration, the UE includes means for determining a value for open loop power control on a primary carrier frequency in the multi-carrier TD-SCDMA communication system and means for performing open loop power control on at least one secondary carrier frequency in the multi-carrier TD-SCDMA system based on the determined value. In another configuration, the UE also includes means for measuring received power on the primary carrier frequency and on the secondary carrier frequencies, means for estimating a difference between the received power on the primary and secondary carrier frequencies based on the estimated difference to perform the open loop power control on the at least one secondary carrier frequency. In a further configuration, the UE also includes means for obtaining a transmit power level offset and means for adjusting the determined value based on the obtained transmit power level offset to perform the open loop power control on the secondary frequencies.

In various aspects, the aforementioned means may be the controller/processor 390, the open loop power control module 393 executed by the controller/processor 390 and stored on the memory 392, the channel processor 394, the antenna 352, the receiver 354, the receive frame processor 360, and the receive processor 370 configured to perform the functions recited by the aforementioned means. In another aspect, the aforementioned means may be a module or any apparatus configured to perform the functions recited by the aforementioned means.

Several aspects of a telecommunications system has been presented with reference to a TD-SCDMA system. As those skilled in the art will readily appreciate, various aspects described throughout this disclosure may be extended to other telecommunication systems, network architectures and communication standards. By way of example, various aspects may be extended to other UMTS systems such as W-CDMA, High Speed Downlink Packet Access (HSDPA), High Speed Uplink Packet Access (HSUPA), High Speed Packet Access Plus (HSPA+) and TD-CDMA. Various aspects may also be extended to systems employing Long Term Evolution (LTE) (in FDD, TDD, or both modes), LTE-Advanced (LTE-A) (in FDD, TDD, or both modes), CDMA2000, Evolution-Data Optimized (EV-DO), Ultra Mobile Broadband (UMB), IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

Several processors have been described in connection with various apparatuses and methods. These processors may be implemented using electronic hardware, computer software, or any combination thereof. Whether such processors are implemented as hardware or software will depend upon the particular application and overall design constraints imposed on the system. By way of example, a processor, any portion of a processor, or any combination of processors presented in this disclosure may be implemented with a microprocessor, microcontroller, digital signal processor (DSP), a field-programmable gate array (FPGA), a programmable logic device (PLD), a state machine, gated logic, discrete hardware circuits, and other suitable processing components configured to perform the various functions described throughout this disclosure. The functionality of a processor, any portion of a processor, or any combination of processors presented in this disclosure may be implemented with software being executed by a microprocessor, microcontroller, DSP, or other suitable platform.

Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium. A computer-readable medium may include, by way of example, memory such as a magnetic storage device (e.g., hard disk, floppy disk, magnetic strip), an optical disk (e.g., compact disc (CD), digital versatile disc (DVD)), a smart card, a flash memory device (e.g., card, stick, key drive), random access memory (RAM), read only memory (ROM), programmable ROM (PROM), erasable PROM (EPROM), electrically erasable PROM (EEPROM), a register, or a removable disk. Although memory is shown separate from the processors in the various aspects presented throughout this disclosure, the memory may be internal to the processors (e.g., cache or register).

Computer-readable media may be embodied in a computer-program product. By way of example, a computer-program product may include a computer-readable medium in packaging materials. Those skilled in the art will recognize how best to implement the described functionality presented throughout this disclosure depending on the particular application and the overall design constraints imposed on the overall system.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

What is claimed is:

1. A method for open loop power control in a multi-carrier Time Division-Synchronous Code Division Multiple Access (TD-SCDMA) communication system, said method comprising:

determining a value for open loop power control on a primary carrier frequency in said multi-carrier TD-SCDMA communication system; and performing open loop power control on at least one secondary carrier frequency in said multi-carrier TD-SCDMA system based on said determined value, a user equipment (UE) of the multi-carrier TD-SCDMA communication system configured to receive a first communication from the primary carrier frequency while receiving a second communication from the primary carrier frequency and/or the at least one secondary carrier frequency.

2. The method of claim 1 wherein said value is determined by measuring a transmission loss of a common control physical channel of said primary carrier frequency.

3. The method of claim 1, wherein said performing comprises:

measuring received power on said primary carrier frequency and on said at least one secondary carrier frequency;

estimating a difference between said received power on said primary carrier frequency and said received power on said at least one secondary carrier frequency; and adjusting said determined value based on said estimated difference to perform said open loop power control on said at least one secondary carrier frequency.

4. The method of claim 3 wherein said received power is measured on a downlink pilot time slot (DwPTS) of said primary carrier frequency and said at least one secondary carrier frequency.

5. The method of claim 3 further comprising:

obtaining a transmit power level offset; and adjusting said determined value based on said obtained transmit power level offset to perform said open loop power control on said at least one secondary carrier frequency.

6. The method of claim 5 wherein said transmit power level offset comprises one of:

a relative offset value relative to said primary carrier frequency; and an absolute power level of said at least one secondary carrier frequency, wherein said transmit power level offset is obtained by determining a difference between said absolute power level of said at least one secondary carrier frequency and a power level of said primary carrier frequency.

7. A user equipment for performing open loop power control in a multi-carrier Time Division-Synchronous Code Division Multiple Access (TD-SCDMA) communication system, said user equipment comprising:

means for determining a value for open loop power control on a primary carrier frequency in said multi-carrier TD-SCDMA communication system; and means for performing open loop power control on at least one secondary carrier frequency in said multi-carrier TD-SCDMA system based on said determined value, the user equipment (UE) of the multi-carrier TD-SCDMA communication system configured to receive a first communication from the primary carrier frequency while receiving a second communication from the primary carrier frequency and/or the at least one secondary carrier frequency.

8. The user equipment of claim 7 wherein said means for determining said value comprises means for measuring a transmission loss of a common control physical channel of said primary carrier frequency.

9. The user equipment of claim 7 wherein said means for performing comprises:
  means for measuring received power on said primary carrier frequency and on said at least one secondary carrier frequency;
  means for estimating a difference between said received power on said primary carrier frequency and said received power on said at least one secondary carrier frequency; and
  means for adjusting said determined value based on said estimated difference to perform said open loop power control on said at least one secondary carrier frequency.

10. The user equipment of claim 9 wherein said received power is measured on a downlink pilot time slot (DwPTS) of said primary carrier frequency and said at least one secondary carrier frequency.

11. The user equipment of claim 9 further comprising:
  means for obtaining a transmit power level offset; and wherein
  the means for adjusting said determined value is further based on said obtained transmit power level offset to perform said open loop power control on said at least one secondary carrier frequency.

12. The user equipment of claim 11 wherein said transmit power level offset comprises one of:
  a relative offset value relative to said primary carrier frequency; and
  an absolute power level of said at least one secondary carrier frequency, wherein said transmit power level offset is obtained by determining a difference between said absolute power level of said at least one secondary carrier frequency and a power level of said primary carrier frequency.

13. A computer program product, comprising:
  a non-transitory computer-readable medium having computer code recorded thereon, said computer code comprising code:
    to determine a value for open loop power control on a primary carrier frequency in a multi-carrier Time Division-Synchronous Code Division Multiple Access (TD-SCDMA) communication system; and
    to perform open loop power control on at least one secondary carrier frequency in said multi-carrier TD-SCDMA system based on said determined value, a user equipment (UE) of the multi-carrier TD-SCDMA system configured to receive a first communication from the primary carrier frequency while receiving a second communication from the primary carrier frequency and/or the at least one secondary carrier frequency.

14. The computer program product of claim 13 wherein said code to determine said value comprises code to measure a transmission loss of a common control physical channel of said primary carrier frequency.

15. The computer program product of claim 13 wherein said code to perform comprises code:
  to measure received power on said primary carrier frequency and on said at least one secondary carrier frequency;
  to estimate a difference between said received power on said primary carrier frequency and said received power on said at least one secondary carrier frequency; and
  to adjust said determined value based on said estimated difference to perform said open loop power control on said at least one secondary carrier frequency.

16. The computer program product of claim 15 wherein said received power is measured on a downlink pilot time slot (DwPTS) of said primary carrier frequency and said at least one secondary carrier frequency.

17. The computer program product of claim 15 further comprising code:
  to obtain a transmit power level offset; and
  to adjust said determined value based on said obtained transmit power level offset to perform said open loop power control on said at least one secondary carrier frequency.

18. The computer program product of claim 17 wherein said transmit power level offset comprises one of:
  a relative offset value relative to said primary carrier frequency; and
  an absolute power level of said at least one secondary carrier frequency, wherein said transmit power level offset is obtained by determining a difference between said absolute power level of said at least one secondary carrier frequency and a power level of said primary carrier frequency.

19. A user equipment for wireless communication, comprising:
  at least one processor; and
  a memory coupled to the at least one processor, the at least one processor being configured:
    to determine a value for open loop power control on a primary carrier frequency in a multi-carrier TD-SCDMA communication system; and
    to perform open loop power control on at least one secondary carrier frequency in said multi-carrier TD-SCDMA system based on said determined value, a user equipment (UE) of the multi-carrier TD-SCDMA system configured to receive a first communication from the primary carrier frequency while receiving a second communication from the primary carrier frequency and/or the at least one secondary carrier frequency.

20. The user equipment of claim 19 wherein said value is determined by measuring a transmission loss of a common control physical channel of said primary carrier frequency.

21. The user equipment of claim 19 wherein said performing comprises:
  measuring received power on said primary carrier frequency and on said at least one secondary carrier frequency;
  estimating a difference between said received power on said primary carrier frequency and said received power on said at least one secondary carrier frequency; and
  adjusting said determined value based on said estimated difference to perform said open loop power control on said at least one secondary carrier frequency.

22. The user equipment of claim 21 wherein said received power is measured on a downlink pilot time slot (DwPTS) of said primary carrier frequency and said at least one secondary carrier frequency.

23. The user equipment of claim 21 further comprising:
  obtaining a transmit power level offset; and
  adjusting said determined value based on said obtained transmit power level offset to perform said open loop power control on said at least one secondary carrier frequency.

24. The user equipment of claim 23 wherein said transmit power level offset comprises one of:
  a relative offset value relative to said primary carrier frequency; and
  an absolute power level of said at least one secondary carrier frequency, wherein said transmit power level offset is obtained by determining a difference between said absolute power level of said at least one secondary carrier frequency and a power level of said primary carrier frequency.

\* \* \* \* \*